US007669217B2

(12) United States Patent
Morioka et al.

(10) Patent No.: US 7,669,217 B2
(45) Date of Patent: Feb. 23, 2010

(54) AV STREAM REPRODUCING APPARATUS, DECODER SWITCHING METHOD, METHOD PROGRAM, PROGRAM STORAGE MEDIUM, AND INTEGRATED CIRCUIT

(75) Inventors: Masaaki Morioka, Higashihiroshima (JP); Kuniaki Sugimoto, Hiroshima (JP)

(73) Assignee: Panasonic Corporation, Osaka (JP)

( * ) Notice: Subject to any disclaimer, the term of this patent is extended or adjusted under 35 U.S.C. 154(b) by 463 days.

(21) Appl. No.: 10/558,582

(22) PCT Filed: Jun. 20, 2005

(86) PCT No.: PCT/JP2005/011683

§ 371 (c)(1),
(2), (4) Date: Nov. 30, 2005

(87) PCT Pub. No.: WO2006/003852

PCT Pub. Date: Jan. 12, 2006

(65) Prior Publication Data

US 2007/0040890 A1    Feb. 22, 2007

(30) Foreign Application Priority Data

Jul. 2, 2004    (JP) .............................. 2004-196308

(51) Int. Cl.
*G04F 3/00* (2006.01)
*G04F 13/00* (2006.01)
*H04N 5/445* (2006.01)
(52) U.S. Cl. ................ 725/49; 725/9; 725/10; 725/48; 725/94
(58) Field of Classification Search .............. 725/9, 725/10, 48, 49, 94; 348/14.01–14.16
See application file for complete search history.

(56) References Cited

U.S. PATENT DOCUMENTS

| 5,859,662 | A | * | 1/1999 | Cragun et al. ............... 725/137 |
| 5,923,814 | A | * | 7/1999 | Boyce ......................... 386/109 |
| 6,028,632 | A | * | 2/2000 | Siong et al. ............. 375/240.01 |
| 7,089,577 | B1 | * | 8/2006 | Rakib et al. .................... 725/87 |
| 2002/0067433 | A1 | * | 6/2002 | Yui et al. ...................... 348/588 |
| 2002/0147987 | A1 | * | 10/2002 | Reynolds et al. ............ 725/110 |
| 2003/0011711 | A1 | | 1/2003 | Shyu |
| 2003/0091115 | A1 | | 5/2003 | Yamana et al. |
| 2004/0128694 | A1 | * | 7/2004 | Bantz et al. .................... 725/95 |
| 2004/0237104 | A1 | * | 11/2004 | Cooper et al. .................. 725/38 |
| 2006/0193384 | A1 | * | 8/2006 | Boyce .................... 375/240.12 |

FOREIGN PATENT DOCUMENTS

| EP | 1 313 311 A2 | 5/2003 |
| JP | 9-163309 | 6/1997 |
| WO | 01/33837 | 5/2001 |

* cited by examiner

*Primary Examiner*—Christopher Kelley
*Assistant Examiner*—Charles N Hicks
(74) *Attorney, Agent, or Firm*—Wenderoth, Lind & Ponack, L.L.P.

(57) ABSTRACT

A decoder performance management portion manages performance of a plurality of decoders provided in an AV stream reproducing apparatus. A display portion changes, in accordance with an instruction from the user, an output state of an image display frame on a screen of an output portion, and notifies it to a decoder management portion. The decoder management portion controls a decoder switching portion so that decoders used for decoding AV streams acquired by a communication portion (106) and a TV receiving portion are switched as appropriate, based on the notification from the display changing portion.

7 Claims, 20 Drawing Sheets

FIG. 2A

| DISPLAY ATTRIBUTE TABLE | | 201 |
|---|---|---|
| VALUE | DISPLAY ATTRIBUTE | |
| 0 | SIZE OF IMAGE DISPLAY FRAME | |
| 1 | Z-AXIS POSITION OF IMAGE DISPLAY FRAME | |
| 2 | VERTICAL POSITION OF IMAGE DISPLAY FRAME | |
| 3 | BRIGHTNESS IN IMAGE DISPLAY FRAME | |

FIG. 2B

| DECODER SELECTING CRITERION TABLE | | 202 |
|---|---|---|
| VALUE | DECODER SELECTING CRITERIA | |
| 0 | HIGH IMAGE QUALITY | |
| 1 | LOW ELECTRIC POWER CONSUMPTION | |

FIG. 2C

| DECODER SWITCHING CRITERION MANAGEMENT TABLE | | 203 |
|---|---|---|
| VALUE | DECODER SWITCHING CRITERIA | |
| 1 | DISPLAY ATTRIBUTE | |
| 0 | DECODER SELECTING CRITERIA | |

FIG. 3

| DECODER CHARACTERISTIC MANAGEMENT TABLE | | | | 301 |
|---|---|---|---|---|
| DECODER ID | NUMBER OF FRAMES | ELECTRIC POWER CONSUMPTION (mWh) | TYPE | |
| 1 | 30 | 600 | HARDWARE | |
| 2 | 20 | 300 | HARDWARE | |
| 3 | 8 | 200 | SOFTWARE | |
| 4 | 15 | 250 | SOFTWARE | |
| ... | ... | ... | ... | |

FIG. 5A

| FRAME ID | APPLICATION TYPE | Z-AXIS ORDER | PREVIOUS DECODER ID | NEW DECODER ID |
|---|---|---|---|---|
| 1 | TV BROADCASTING | 1 | — | 1 |
| 2 | BROWSER | 2 | — | 2 |

| FRAME ID | APPLICATION TYPE | Z-AXIS ORDER | PREVIOUS DECODER ID | NEW DECODER ID |
|---|---|---|---|---|
| 1 | TV BROADCASTING | 2 | 1 | 2 |
| 2 | TV TELEPHONE | 1 | — | 1 |
| 3 | BROWSER | 3 | 2 | 3 |

| FRAME ID | APPLICATION TYPE | Z-AXIS ORDER | PREVIOUS DECODER ID | NEW DECODER ID |
|---|---|---|---|---|
| 1 | TV BROADCASTING | 1 | 2 | 1 |
| 2 | TV TELEPHONE | 2 | 1 | 2 |
| 3 | BROWSER | 3 | 3 | 3 |

| FRAME ID | APPLICATION TYPE | UPPER LEFT COORDINATES | LOWER RIGHT COORDINATES | FRAME SIZE | PREVIOUS DECODER ID | NEW DECODER ID |
|---|---|---|---|---|---|---|
| 1 | TV BROADCASTING | (0,0) | (260,240) | 62400 | — | 1 |

| FRAME ID | APPLICATION TYPE | UPPER LEFT COORDINATES | LOWER RIGHT COORDINATES | FRAME SIZE | PREVIOUS DECODER ID | NEW DECODER ID |
|---|---|---|---|---|---|---|
| 1 | TV BROADCASTING | (0,0) | (260,240) | 62400 | 1 | 1 |
| 2 | TV TELEPHONE | (120,230) | (260,370) | 19600 | — | 2 |

| FRAME ID | APPLICATION TYPE | UPPER LEFT COORDINATES | LOWER RIGHT COORDINATES | FRAME SIZE | PREVIOUS DECODER ID | NEW DECODER ID |
|---|---|---|---|---|---|---|
| 1 | TV BROADCASTING | (130,0) | (260,120) | 15600 | 1 | 2 |
| 2 | TV TELEPHONE | (0,120) | (260,370) | 65000 | 2 | 1 |

| FRAME ID | APPLICATION TYPE | VERTICAL POSITION | PREVIOUS DECODER ID | NEW DECODER ID |
|---|---|---|---|---|
| 1 | TV BROADCASTING | 1 | — | 1 |
| 2 | TV TELEPHONE | 2 | — | 2 |

| FRAME ID | APPLICATION TYPE | VERTICAL POSITION | PREVIOUS DECODER ID | NEW DECODER ID |
|---|---|---|---|---|
| 1 | TV BROADCASTING | 2 | 1 | 2 |
| 2 | TV TELEPHONE | 1 | 2 | 1 |

| FRAME ID | APPLICATION TYPE | BRIGHTNESS ORDER | PREVIOUS DECODER ID | NEW DECODER ID |
|---|---|---|---|---|
| 1 | TV BROADCASTING | 1 | — | 1 |
| 2 | TV TELEPHONE | 2 | — | 2 |

| FRAME ID | APPLICATION TYPE | BRIGHTNESS ORDER | PREVIOUS DECODER ID | NEW DECODER ID |
|---|---|---|---|---|
| 1 | TV BROADCASTING | 2 | 1 | 2 |
| 2 | TV TELEPHONE | 1 | 2 | 1 |

| FRAME ID | APPLICATION TYPE | APPLICATION TYPE OPERATING SAME TIME | PREVIOUS USER'S WATCHING/ LISTENING FORM | NEW USER'S WATCHING/LISTENING FORM | PREVIOUS DECODER ID | NEW DECODER ID |
|---|---|---|---|---|---|---|
| 1 | TV BROADCASTING | TV TELEPHONE INCOMING VIDEO | MICROPHONE CLOSED | MICROPHONE OPENED | 1 | 2 |
| | | | EARPHONE/MICROPHONE NOT CONNECTED | EARPHONE/MICROPHONE CONNECTED | | |
| 2 | TV TELEPHONE INCOMING VIDEO | TV BROADCASTING | MICROPHONE CLOSED | MICROPHONE OPENED | 2 | 1 |
| | | | EARPHONE/MICROPHONE NOT CONNECTED | EARPHONE/MICROPHONE CONNECTED | | |

1301

ROTATION   SLIDE   FLIP

EARPHONE/MICROPHONE CONNECTION

AV STREAM REPRODUCING APPARATUS, DECODER SWITCHING METHOD, METHOD PROGRAM, PROGRAM STORAGE MEDIUM, AND INTEGRATED CIRCUIT

TECHNICAL FIELD

The present invention relates to an AV stream reproducing apparatus for reproducing a plurality of AV streams with a plurality of decoders. More specifically, the present invention relates to an AV stream reproducing apparatus in which decoders for decoding AV streams are switched as appropriate in accordance with a user's watching/listening form, a decoder switching method that is executed by the apparatus, a program for executing the method, a medium for storing the program, and an integrated circuit.

BACKGROUND ART

Recently, portable telephones have supported a TV telephone function in which it is possible to have a conversation using not only audio but also video. Also, on the other hand, in accordance with digitalization of TV broadcasting, a TV receiving function has been supported so that it is possible to watch TV also on portable telephones. In order to realize these functions, it is necessary for portable telephones to be provided with decoders for decoding stream data such as video and audio corresponding to each of the services in real-time. Also, in order to provide a plurality of services at the same time, it is necessary to include a plurality of decoders.

On the other hand, with the development of device technology, a decoder has been developed that corresponds to a plurality of stream data codecs. By including this decoder, it is possible to manufacture generic purpose portable telephones that do not specialize in their corresponding services, and thus there is an industrial advantage.

Hereinafter, an example of a portable telephone will be explained in which a plurality of decoders are included so that it is possible to correspond to a plurality of services. FIG. 17 is a diagram showing an outlined configuration of a portable telephone system and a display example of a portable telephone screen. FIG. 18 is a diagram showing an example of a hardware configuration of a portable telephone 1700.

Referring to FIG. 17, the portable telephone 1700 receives, with a communication antenna 1721, TV telephone data sent from another portable telephone (not shown) via a communication network 1701 and a telephone base station 1702. Then, the portable telephone 1700 decodes the received TV telephone data and displays the data on an LCD panel 1751 as a TV telephone application. Herein, an image display frame for the TV telephone application is taken as a TV telephone frame 1720.

Furthermore, the portable telephone 1700 receives, with a broadcast antenna 1711, TV broadcast data sent from a broadcast station 1703. Then, the portable telephone 1700 decodes the received TV broadcast data and displays the data on the LCD panel 1751 as a TV receiving application. Herein, a frame for displaying the TV receiving application is taken as a TV broadcast frame 1710.

Also, the portable telephone 1700 is provided with a speaker 1761 through which audio is output and keys 1731 with which the user controls operations of the TV telephone application and the TV receiving application described above. In the portable telephone 1700, description of other functions that do not directly relate to the present invention has been omitted.

Referring to FIG. 18, the portable telephone 1700 is provided with at least a CPU 1801 for controlling the entire device, a ROM 1802 and a RAM 1803 for storing a program and the like, a bus 1805, a TV receiving portion 1810 for receiving TV broadcast data obtained via the broadcast antenna 1711, a communication portion 1820 for sending and receiving TV telephone data via the communication antenna 1721, a key controller 1830 for controlling the on/off of the keys 1731, two decoders A 1841 and B 1842 for decoding AV streams received by the TV receiving portion 1810 and the communication portion 1820, an LCD controller 1850 for letting the decoded result be displayed in the image display frames 1710 and 1720 on the LCD panel 1751, and a D/A converter 1860 with which audio data decoded by the decoder A 1841 and the decoder B 1842 is converted into an analog signal and output to the speaker 1761.

Next, the relationship between decoders and application image display frames in conventional techniques will be explained.

FIG. 19 shows the relationship between decoders and application image display frames in a general conventional technique. In a screen display example, the TV receiving portion 1810 is connected to the decoder A 1841, and the communication portion 1820 is connected to the decoder B 1842, respectively, in a fixed manner. Data decoded by the decoder A 1841 is displayed on the LCD panel 1751 as the image display frame 1710 for a TV broadcast application, and data decoded by the decoder B 1842 is displayed on the LCD panel 1751 as the image display frame 1720 for a TV telephone application. Each of the applications is output through not only the image display frames but also the speaker 1761 as audio. An output portion 1880 in FIG. 18 includes both the LCD panel 1751 and the speaker 1761.

Furthermore, there is a technique in which as a method for connecting decoders, in an AV system that includes a display apparatus connected with a plurality of AV devices and having a decoding function, a decoder that is suitable (can perform a process) is selected in accordance with a signal to be processed, and the signal is decoded. In this technique, as shown in FIG. 20, for example, in the case where a plurality of kinds of stream data are input at an IEEE 1394 interface 2001, the stream data is distributed to optimal decoders by a data dividing switch 2002.

Generally, when a plurality of decoders are included in a portable telephone, it is preferable that high-performance decoders are included. However, there is the trade-off relationship between the performance, and the electric power consumption and manufacturing cost of a decoder. Therefore, a large number of manufacturers are confronted with a choice below from the viewpoint of the balance between services provided by portable telephones and their price.

The choice is whether only high-performance decoders are included so that the service quality is given priority over the portable telephone price, or only low-performance decoders are included so that the portable telephone price is given priority over the service quality. Other than this, a choice is conceivable in which a plurality of decoders having a difference in their performance are included so that the intermediate level is taken for the portable telephone price and the service quality. More specifically, a high-performance decoder is allocated to the main services and a low-performance decoder is allocated to the other services.

For example, it is assumed that the decoder A 1841 is a high-performance decoder in which the electric power consumption is high but the image quality is good, and that the decoder B 1842 is a low-performance decoder in which the electric power consumption is low but the image quality is poor. It is also assumed that both of the decoder A 1841 and the decoder B 1842 correspond to both of a codec for TV telephone data and a codec for TV broadcast data.

Herein, there is the problem that in the conventional configuration of a portable telephone, a combination of a decoder and input data thereinto is allocated in a fixed manner at least at the time of starting a service, and thus the decoder cannot be switched dynamically during the service. For example, the case will be described in which while watching TV with high-quality images using the high-performance decoder A 1841, there is an incoming TV telephone call. In this case, although the interest of the user has shifted to the incoming TV telephone, the high-performance decoder A 1841 has been already allocated for watching TV, and thus the TV telephone has to use the low-performance decoder B 1842 and is performed at a low quality.

SUMMARY OF THE INVENTION

Therefore, it is an object of the present invention to provide an AV stream reproducing apparatus and a decoder switching method with which even when a service is being provided, it is possible to dynamically switch to an optimal decoder for decoding an AV stream among a plurality of decoders.

The present invention is directed to an AV stream reproducing apparatus in which images reproduced from a plurality of AV streams are displayed on a screen at the same time. In order to realize the above-described object, the AV stream reproducing apparatus of the present invention is provided with an AV stream acquisition portion, a plurality of decoders, a decoder performance management portion, a mode setting portion, a decoder management portion, a decoder switching portion, and an output portion.

The AV stream acquisition portion acquires a plurality of AV streams. The plurality of decoders decode the plurality of AV streams. The decoder performance management portion manages information relating to performance of the plurality of decoders. The mode setting portion sets a user's watching/listening form for determining an AV stream to which a specific decoder is to be preferentially allocated. The decoder management portion determines a decoder to be allocated to each of the AV streams, based on setting of the mode setting portion and information from the decoder performance management portion, and in accordance with a user's watching/listening form instructed or operated by the user. The decoder switching portion switches, according to determination of the decoder management portion, between decoders used for decoding the AV streams. The output portion lets a plurality of images decoded by the plurality of decoders be displayed on a screen at the same time using individual image display frames.

A preferred user's watching/listening form is a screen display state at a time when an image display frame corresponding to each of the AV streams is displayed on the screen of the output portion. Examples of a typical screen display state include the Z-axis position (overlap order) of the image display frame, the size of the image display frame, the display position of the image display frame, or the brightness in the image display frame. Furthermore, as another preferred user's watching/listening form, an apparatus form of the AV stream reproducing apparatus is transformable. The apparatus form of the AV stream reproducing apparatus may be determined with the screen display state, or may be determined independently.

Each of the processes performed by each of the components of the AV stream reproducing apparatus described above can be regarded as a decoder switching method that gives a series of procedures. This method is provided in the form of a program for letting a computer execute the series of procedures. The program may be introduced in a computer in the form stored in a computer-readable storage medium. The functional blocks of the mode setting portion, the decoder management portion, the decoder performance management portion, and the decoder switching portion that constitute the AV stream reproducing apparatus may be realized as an LSI, which is an integrated circuit.

With the present invention described above, even when a service is being provided, it is possible to perform a switching so that an AV stream displayed in an image display frame that attracts much attention of the user in accordance with a change in the screen display state and the apparatus form (user's watching/listening form) always can be decoded using a high image-quality decoder.

BRIEF DESCRIPTION OF THE DRAWINGS

FIG. 2A is an example of display attribute information.

FIG. 2B is an example of decoder selecting criterion information.

FIG. 2C is an example of decoder switching criterion management information.

FIG. 3 is an example of decoder characteristic management information.

FIGS. 5A to 5C are examples of display attribute management tables in Example 1.

FIGS. 7A to 7C are examples of display attribute management tables in Example 2.

FIGS. 9A and 9B are examples of display attribute management tables in Example 3.

FIGS. 11A and 11B are examples of display attribute management tables in Example 4.

FIG. 13 is an example of a display attribute management table in Example 5.

DETAILED DESCRIPTION OF THE INVENTION

Hereinafter, an AV stream reproducing apparatus and a decoder switching method of the present invention will be explained, using as an example the case where the present invention has been applied to a portable telephone. The system configuration using the AV stream reproducing apparatus of the present invention and the hardware configuration of the AV stream reproducing apparatus are as described in FIGS. 17 and 18.

Figure 1:
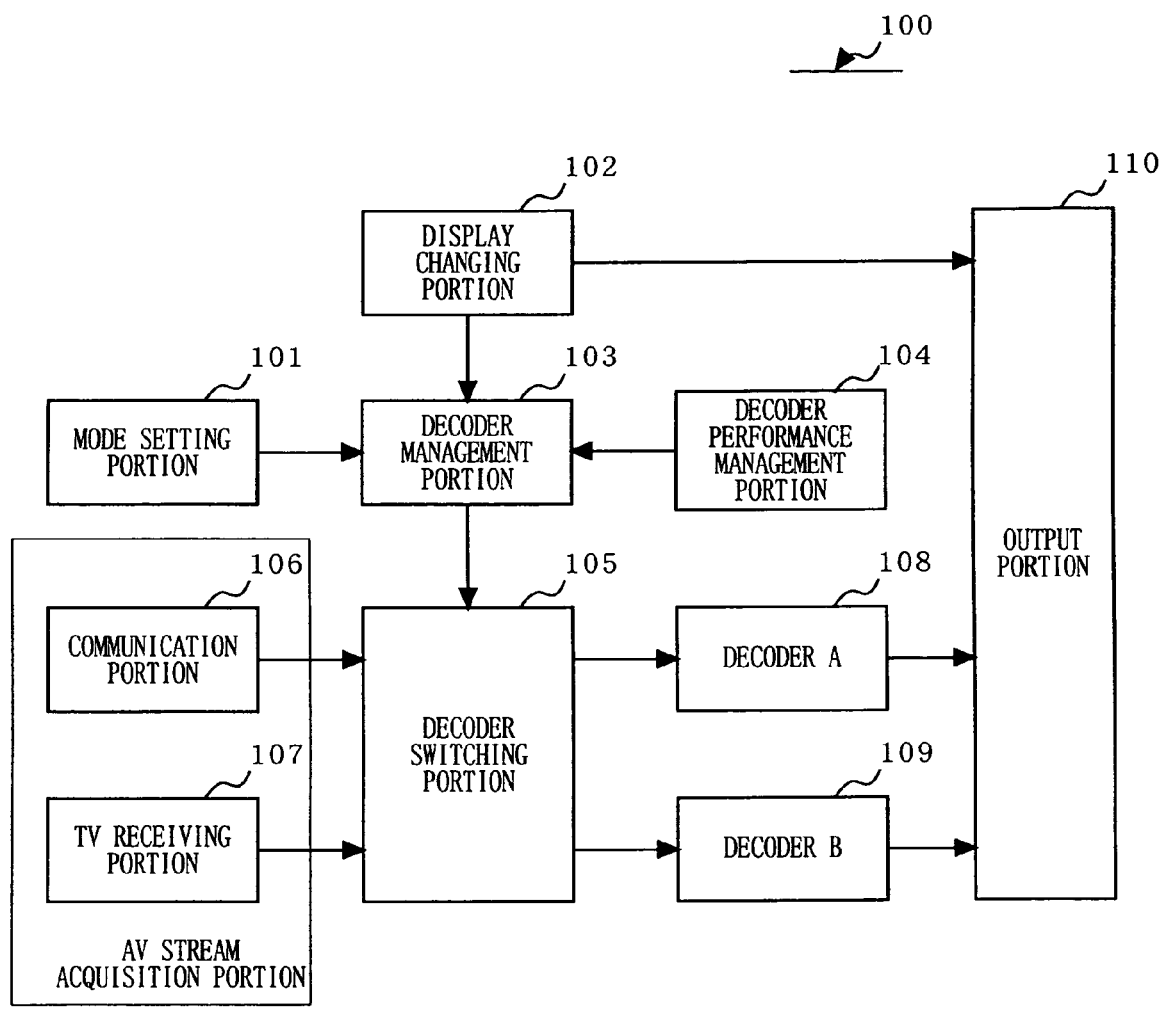
FIG. 1 is a diagram showing a configuration example of an AV stream reproducing apparatus according to an embodiment of the present invention.

FIG. 1 is a diagram showing a configuration example of an AV stream reproducing apparatus 100 according to an embodiment of the present invention. In FIG. 1, the AV stream reproducing apparatus 100 of the present invention is provided with a mode setting portion 101, a display changing portion 102, a decoder management portion 103, a decoder performance management portion 104, a decoder switching portion 105, a communication portion 106, a TV receiving portion 107, a decoder A 108, a decoder B 109, and an output portion 110. The communication portion 106 and the TV receiving portion 107 constitute an AV stream acquisition portion.

First, an outline of each of the components of the AV stream reproducing apparatus 100 will be explained below.

The mode setting portion 101 stores display attribute information relating to a screen display state at the time of switching between decoders and decoder selecting criterion information relating to the priority of decoders that are to be switched. FIGS. 2A and 2B show examples of display attribute information 201 and decoder selecting criterion information 202 that are stored by the mode setting portion 101 and given in the form of a table. In the example shown in FIG. 2A, the size of the image display frame (value=0), the Z-axis position of the image display frame (value=1), the vertical position of the image display frame (value=2), and the brightness in the image display frame (value=3) of an image displayed on the screen of the output portion 110 are set in advance as the display attributes. As for the size of the image display frame, a decoder is preferentially allocated to the one in which the frame size is larger. As for the Z-axis position of the image display frame, a decoder is preferentially allocated to the one that is shorter in the Z-axis direction (depth), that is, the one on the front side. As for the vertical position of the image display frame, a decoder is preferentially allocated to the one in which the position of the image display frame is on the upper side. As for the brightness in the image display frame, a decoder is preferentially allocated to the one in which the display brightness in the image display frame is higher. In the example shown in FIG. 2B, giving priority to a decoder with a good image quality (value=0) and giving priority to a decoder with a low electric power consumption (value=1) are set in advance as the decoder selecting criteria.

The user selects a desired decoder switching condition among the display attribute information 201 and the decoder selecting criterion information 202, and sets the condition as a decoder switching criterion management table 203 at the mode setting portion 101. FIG. 2C is a diagram showing an example of the decoder switching criterion management table 203 in which the Z-axis position of the image display frame (value=1) is set as the display attribute and the high image quality (value=0) is set as the decoder selecting criterion.

The decoder performance management portion 104 stores, with respect to a plurality of decoders (in addition to the decoder A 108 and the decoder B 109 constituted by hardware, decoders constituted by software are included) provided in the AV stream reproducing apparatus 100, decoder characteristic management information 301, which is information relating to the characteristic of the decoders. FIG. 3 shows an example of the decoder characteristic management information 301 stored by the decoder performance management portion 104. In the example shown in FIG. 3, the number of frames (the larger the number is, the higher the image quality is), the electric power consumption, and the hardware/software type (the effect of reducing electric power consumption can be achieved more with software) are managed for each of the decoders. It is shown that a hardware decoder with an ID of "1" has the highest image quality (30 frames) and a software decoder with an ID of "3" consumes electric power least (200 mWh).

The display changing portion 102 changes, in accordance with an instruction from the user, an output state of an image display frame on the screen of the output portion 110. The display changing portion 102 notifies the contents of this change to the decoder management portion 103.

The decoder management portion 103 manages information relating to an application type, a display attribute, and a decoder used for decoding, for each of the acquired AV streams, based on the notification from the communication portion 106, the TV receiving portion 107, and the display changing portion 102. The decoder management portion 103 instructs a switching control at the decoder switching portion 105 in accordance with the management contents. This management is carried out by using, for example, a display attribute management table shown in FIG. 5A (described later).

Figure 17:
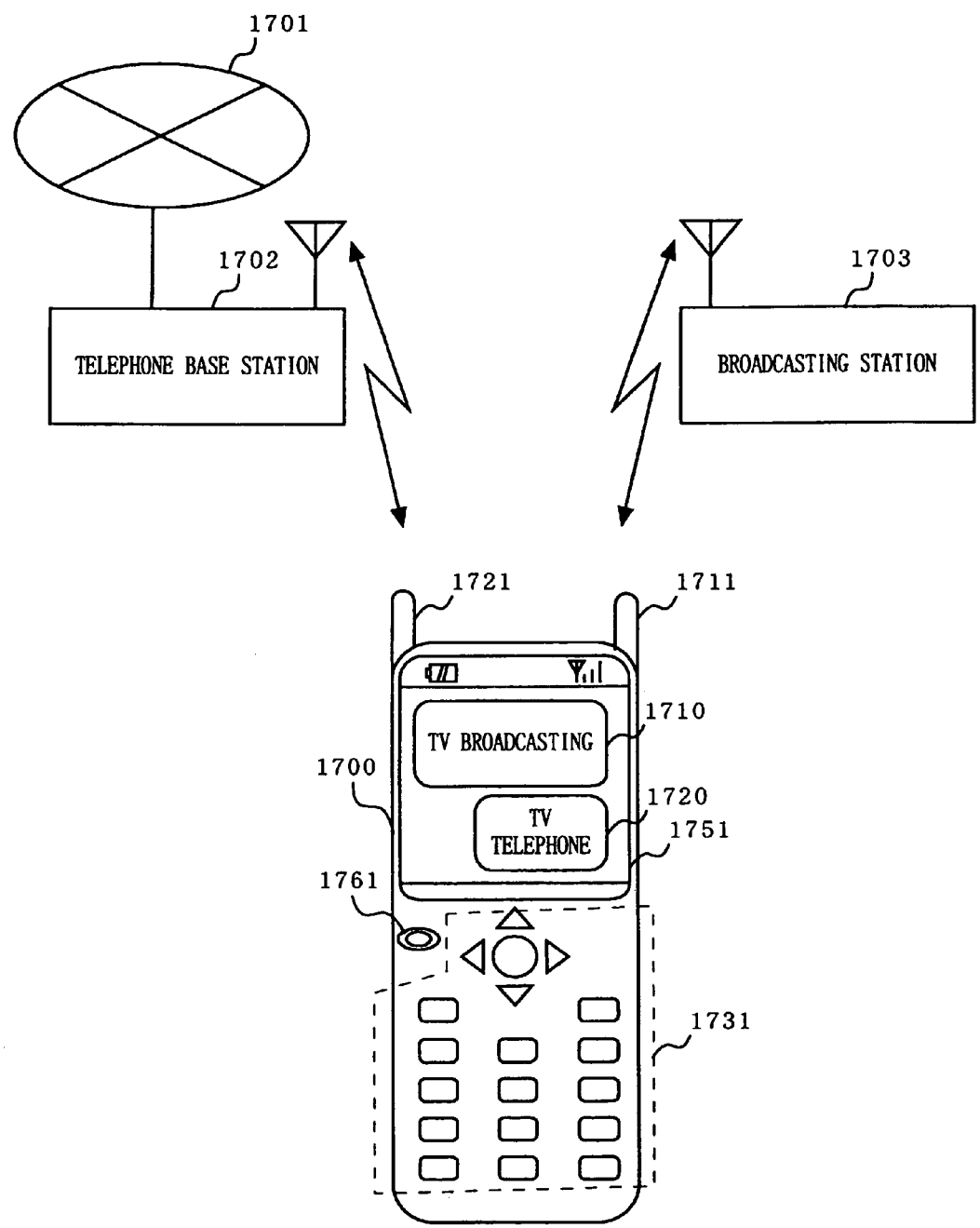
FIG. 17 is a diagram showing an outlined configuration of a portable telephone system and a display example of a portable telephone screen.
Figure 18:
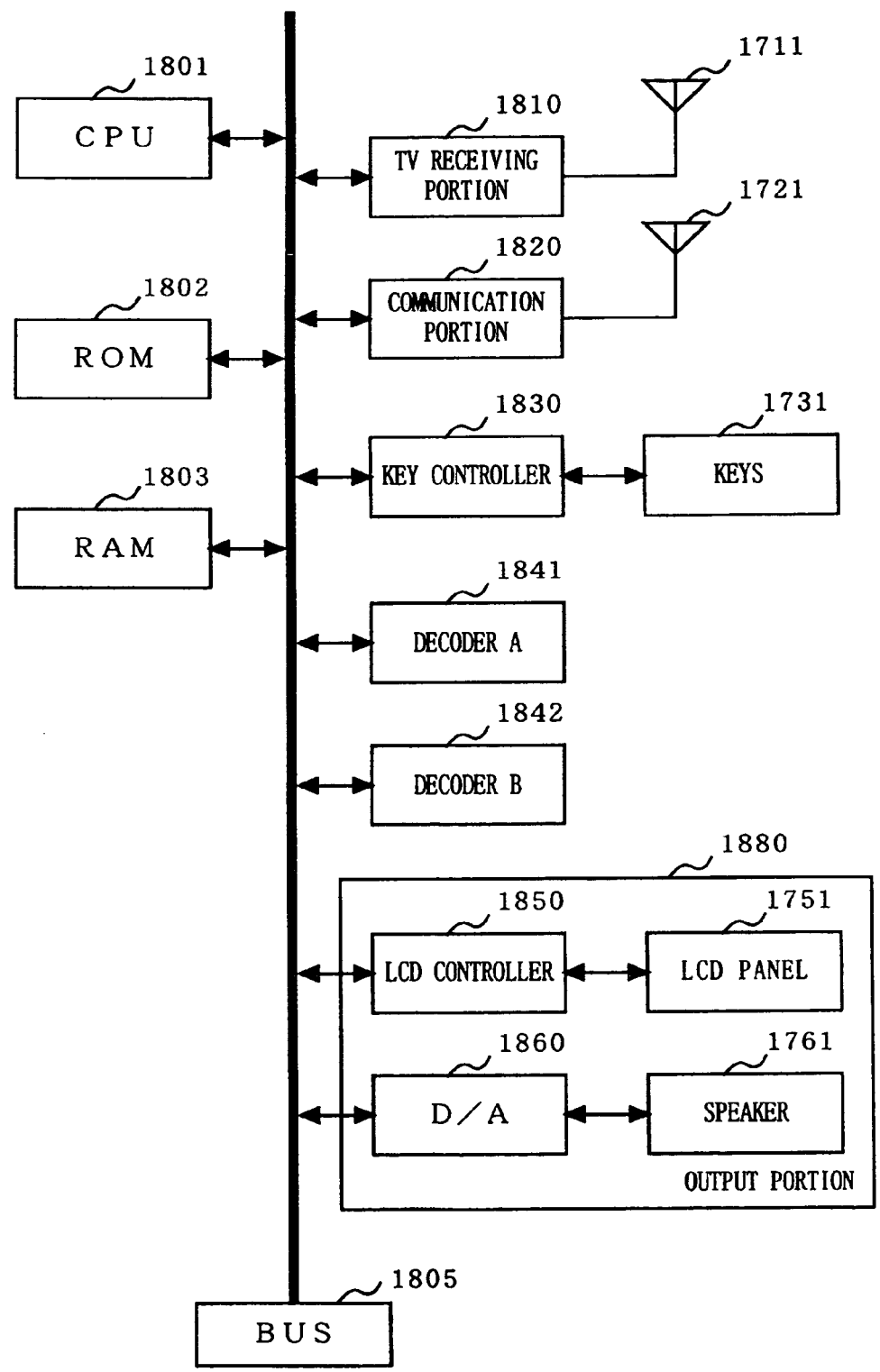
FIG. 18 is a diagram showing an example of a hardware configuration of a portable telephone.
Figure 19:
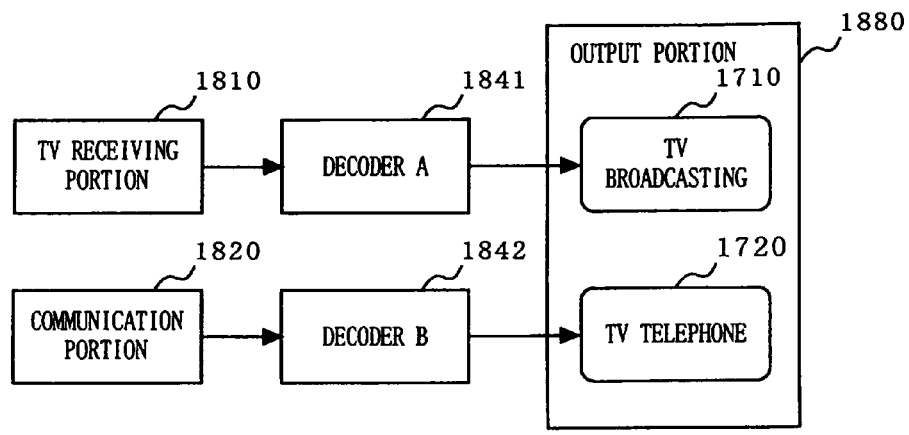
FIGS. 19 and 20 are diagrams showing configuration examples of the main functional components in the conventional technique.
Figure 20:
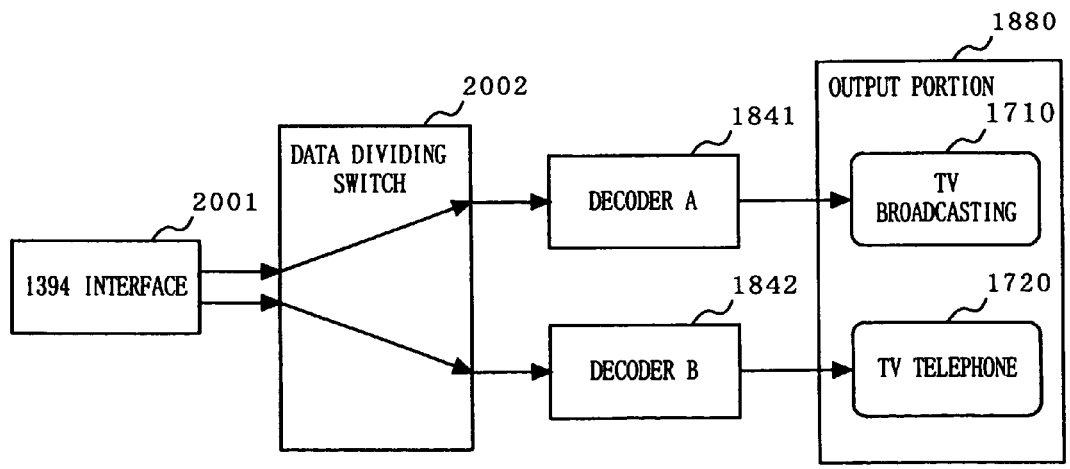

The communication portion 106 sends/receives a TV telephone signal to/from the telephone base station 1702 (see FIG. 17). The TV receiving portion 107 receives a TV broadcast signal from the broadcast station 1703 (see FIG. 17). The decoder switching portion 105 dynamically switches between decoders for processing AV streams, in accordance with the instruction from the decoder management portion 103. The decoder A 108 is a high-performance hardware decoder that can provide an image with a high image quality. The decoder B 109 is a low-performance hardware decoder that can provide an image with a low image quality. The image decoded by the decoder A 108 and/or the decoder B 109 is output to the LCD panel 1751 and the speaker 1761 by the output portion 110 (see FIG. 18).

Figure 4:
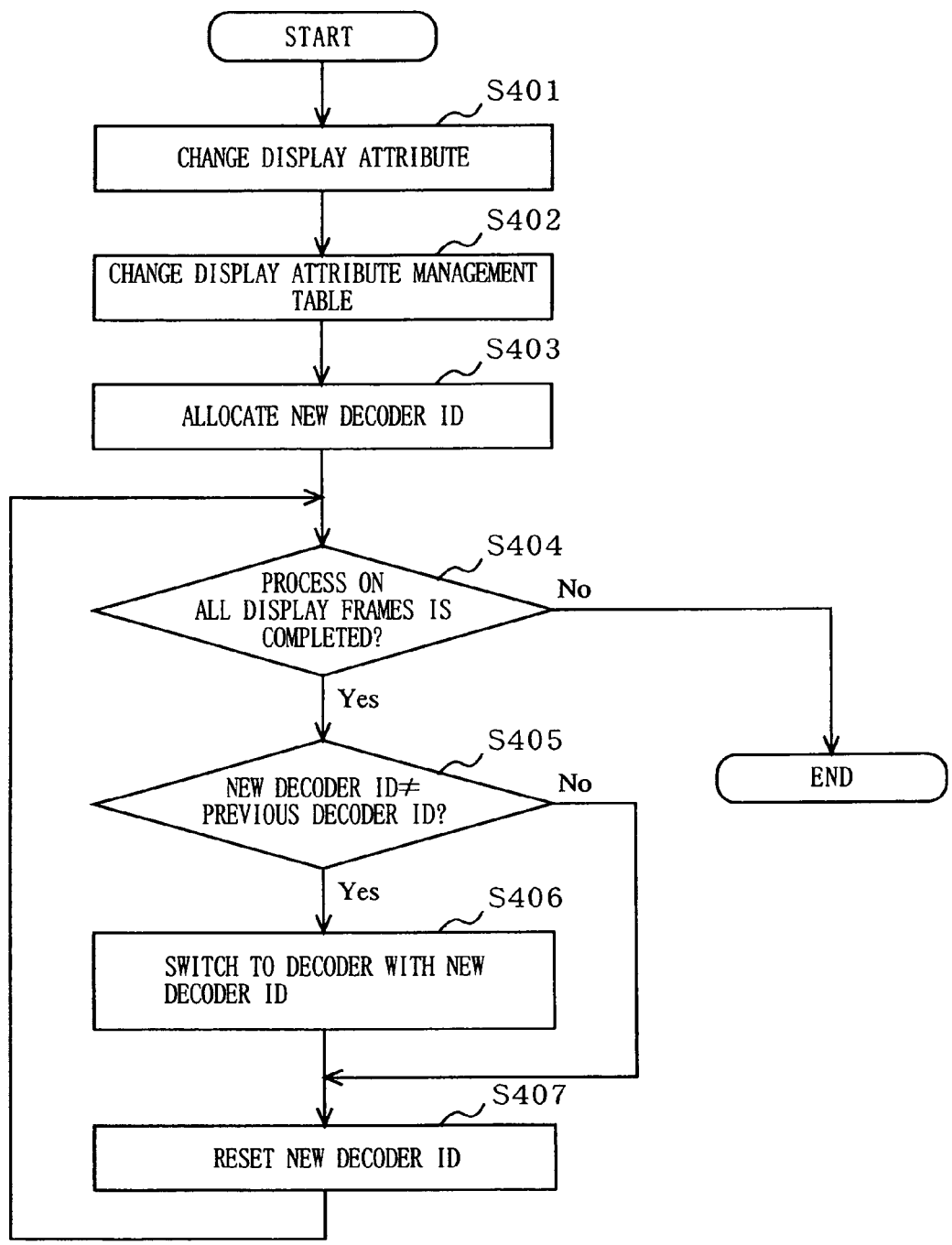
FIG. 4 is a flowchart showing the procedure of a decoder switching method according to an embodiment of the present invention.

Next, a decoder switching method executed by the AV stream reproducing apparatus 100 of the present invention will be specifically described for each of the kinds of the display attributes. FIG. 4 is a flowchart showing the procedure of the decoder switching method executed by the AV stream reproducing apparatus 100 according to an embodiment of the present invention.

Example 1

Figure 6A:
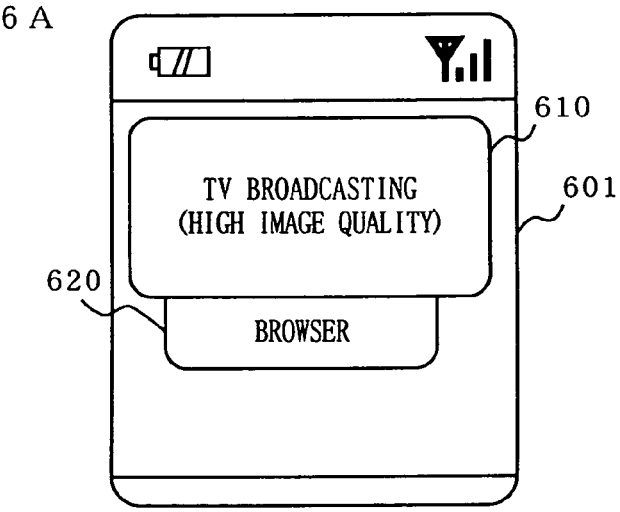
FIGS. 6A to 6C are examples of display screens in Example 1.
Figure 6B:
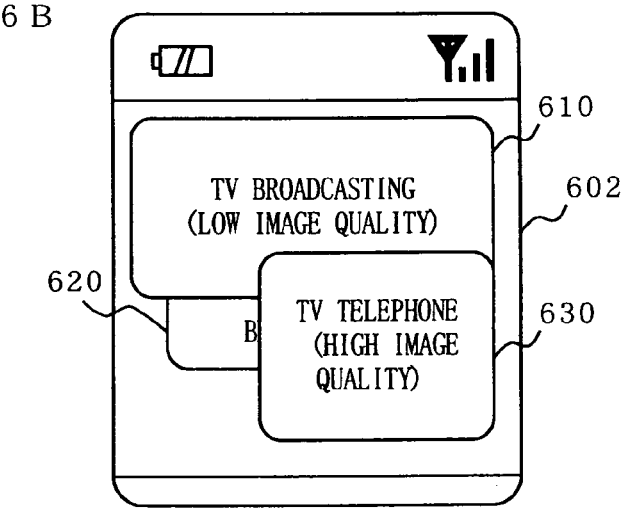
Figure 6C:
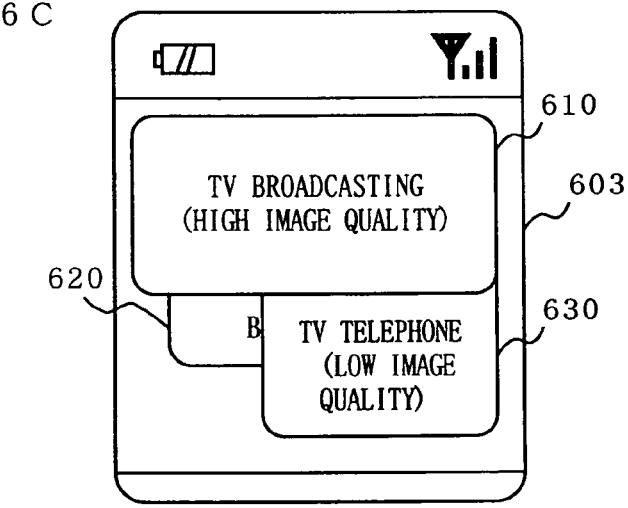

In Example 1, the case will be explained in which the Z-axis position of the image display frame (value=1) is set as the display attribute and the high image quality (value=0) is set as the decoder selecting criterion, in the decoder switching criterion management table 203 shown in FIG. 2C. FIGS. 5A to 5C are diagrams showing examples of display attribute management tables 501 to 503. FIGS. 6A to 6C are diagrams showing examples of display screens 601 to 603 of the output portion 110 corresponding to FIGS. 5A to 5C.

Now, the case will be described in which a TV broadcast frame 610 and a browser frame 620 are displayed on the screen 601 in accordance with the display attribute management table 501 shown in FIG. 5A (FIG. 6A). In this case, since the Z-axis order of the TV broadcast frame 610 has the highest priority, a high image-quality decoder (decoder ID "1" in FIG. 3) is allocated for the process of the TV broadcasting. Next, it is assumed that in this state, a TV telephone frame 630 is up. Immediately after this start-up, the TV telephone frame 630 is the frontmost in the Z-axis direction (FIG. 6B), and thus the display attribute management table 502 is changed so that the high image-quality decoder is allocated for the process of the TV telephone (FIG. 5B).

Subsequently, when an instruction is given from the user via the display changing portion 102 to display the TV broadcast frame 610 frontmost, that is, when there is an instruction to change the display attribute (step S401), the display attribute management table 503 is changed so that the high image-quality decoder is allocated for the process of the TV broadcasting (steps S402 and S403, FIGS. 5C and 6C). For all of the image display frames, it is determined whether or not the ID of the newly allocated decoder matches the ID of the previous decoder before the allocation (steps S404 and S405), and the previous decoder is switched by the new decoder only when they do not match each other (step S406). Subsequently, the new decoder ID is reset (step S407). The ID that has been reset is, for example, "0". When the process on all of the image display frames is completed, the decoder switching process ends.

With the above processes, even when a service is being provided, it is possible to perform a switching so that an AV stream displayed in an image display frame that is positioned frontmost in the order in the Z-axis direction and that thus attracts much attention of the user always can be decoded using a high image-quality decoder.

Example 2

Figure 8A:
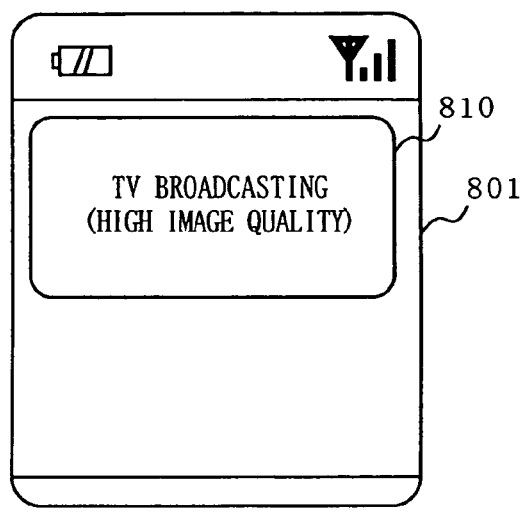
FIGS. 8A to 8C are examples of display screens in Example 2.
Figure 8B:
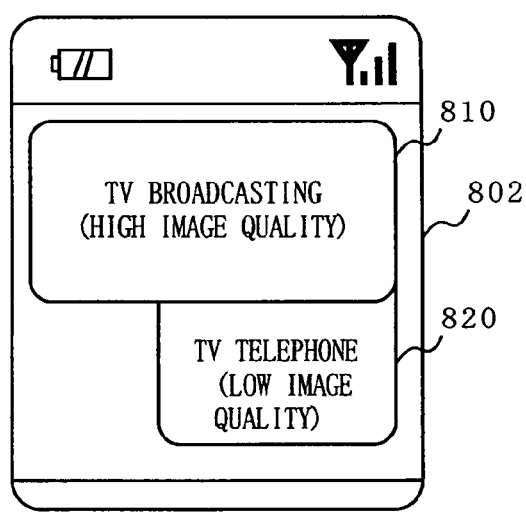
Figure 8C:
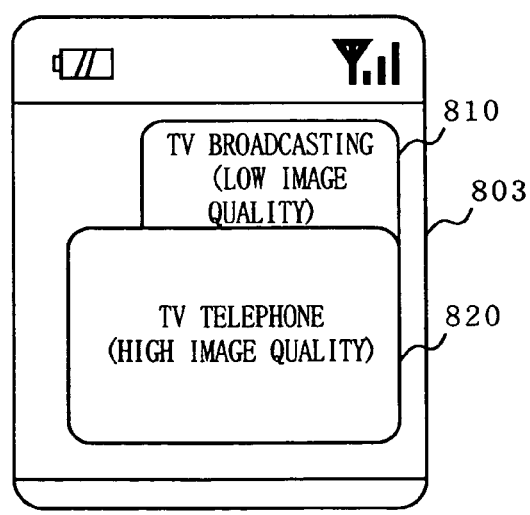

In Example 2, the case will be explained in which the size of the image display frame (value=0) is set as the display attribute and the high image quality (value=0) is set as the decoder selecting criterion, in the decoder switching criterion management table 203 shown in FIG. 2C. FIGS. 7A to 7C are diagrams showing examples of display attribute management tables 701 to 703. FIGS. 8A to 8C are diagrams showing examples of display screens 801 to 803 of the output portion 110 corresponding to FIGS. 7A to 7C.

Now, the case will be described in which only a TV broadcast frame 810 is displayed on the screen 801 (FIGS. 7A and 8A). Next, it is assumed that in this state, a TV telephone frame 820 is up. Immediately after this start-up, the size of the TV telephone frame 820 (region determined by the upper left coordinates and the lower right coordinates) is smaller than the size of the TV broadcast frame 810 (FIG. 8B), and thus the display attribute management table 702 is changed so that a high image-quality decoder is allocated for the process of the TV broadcasting (FIG. 7B). The size of the image display frame can be calculated based on the length of the diagonal line from the upper left coordinates to the lower right coordinates.

Subsequently, when an instruction is given from the user via the display changing portion 102 to decrease the size of the TV broadcast frame 810 and to increase the size of the TV telephone frame 820 (step S401), the display attribute management table 703 is changed so that the high image-quality decoder is allocated for the process of the TV telephone (steps S402 and S403, FIGS. 7C and 8C). Subsequent processes are as described above.

With the above processes, even when a service is being provided, it is possible to perform a switching so that an AV stream displayed in an image display frame whose size is the largest and that thus attracts much attention of the user always can be decoded using a high image-quality decoder.

Example 3

Figure 10A:
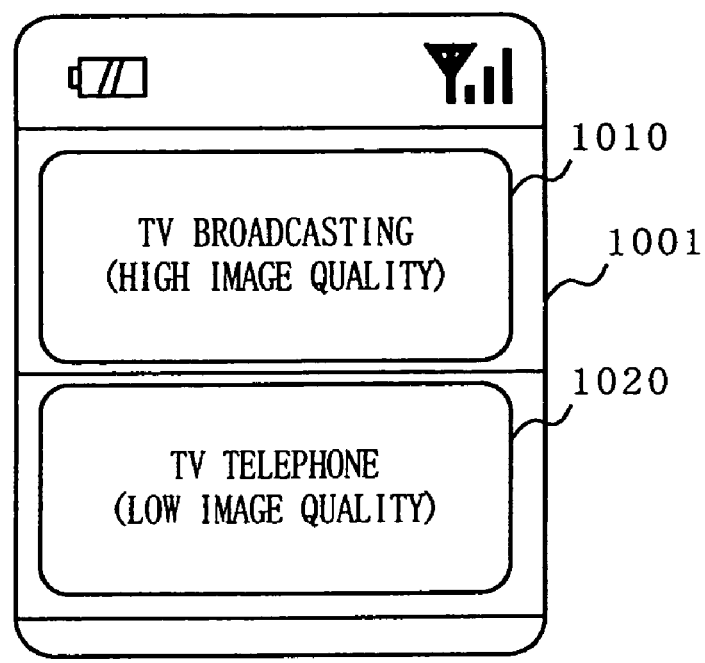
FIGS. 10A and 10B are examples of display screens in Example 3.
Figure 10B:
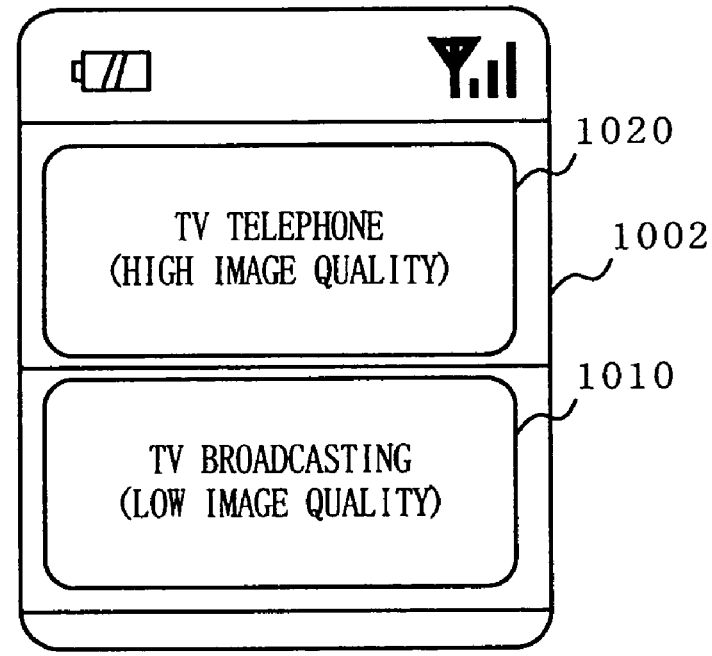

In Example 3, the case will be explained in which the vertical position of the image display frame (value=2) is set as the display attribute and the high image quality (value=0) is set as the decoder selecting criterion, in the decoder switching criterion management table 203 shown in FIG. 2C. FIGS. 9A and 9B are diagrams showing examples of display attribute management tables 901 and 902. FIGS. 10A and 10B are diagrams showing examples of display screens 1001 and 1002 of the output portion 110 corresponding to FIGS. 9A and 9B.

Now, the case will be described in which a TV broadcast frame 1010 is displayed on the upper side on a screen 1001 and a TV telephone frame 1020 is displayed on the lower side on the screen 1001 (FIG. 10A). In this state, a high image-quality decoder (decoder ID "1" in FIG. 3) is allocated for the process of the TV broadcasting (FIG. 9A).

Subsequently, when an instruction is given from the user via the display changing portion 102 to move the TV telephone frame 1020 to the upper side and to move the TV broadcast frame 1010 to the lower side (step S401), the display attribute management table 902 is changed so that the high image-quality decoder is allocated for the process of the TV telephone (steps S402 and S403, FIGS. 9B and 10B). Subsequent processes are as described above.

With the above processes, even when a service is being provided, it is possible to perform a switching so that an AV stream displayed in an image display frame that is positioned on the uppermost side and that thus attracts much attention of the user always can be decoded using a high image-quality decoder.

Example 4

Figure 12A:
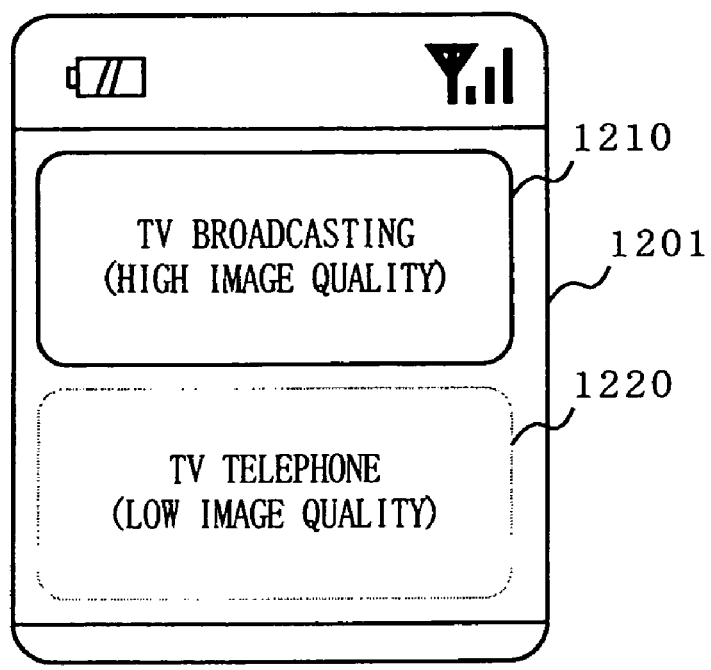
FIGS. 12A and 12B are examples of display screens in Example 4.
Figure 12B:
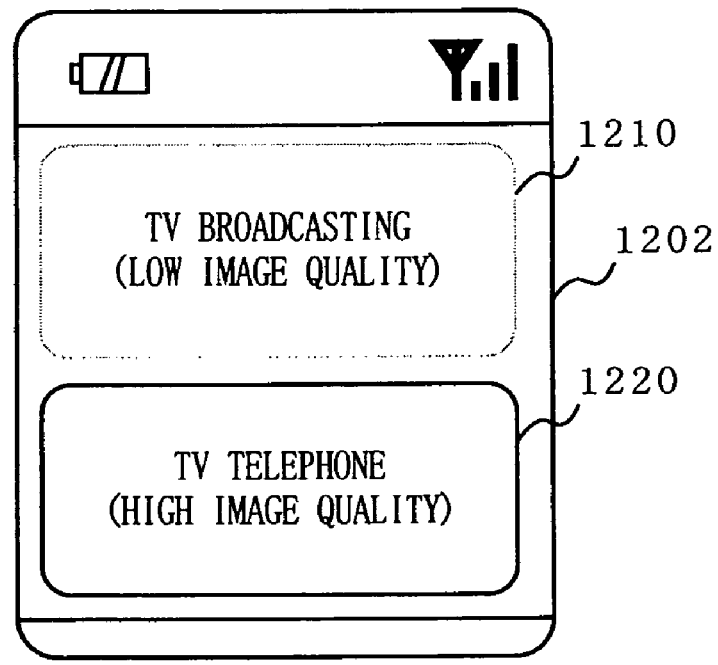

In Example 4, the case will be explained in which the brightness in the image display frame (value=3) is set as the display attribute and the high image quality (value=0) is set as the decoder selecting criterion, in the decoder switching criterion management table 203 shown in FIG. 2C. FIGS. 11A and 11B are diagrams showing examples of display attribute management tables 1101 and 1102. FIGS. 12A and 12B are diagrams showing examples of display screens 1201 and 1202 of the output portion 110 corresponding to FIGS. 11A and 11B.

Now, the case will be described in which a TV broadcast frame 1210 is displayed with a high brightness (screen is bright) and a TV telephone frame 1220 is displayed with a low brightness (screen is dark), respectively, on the screen 1201 (FIG. 12A). In this state, a high image-quality decoder (decoder ID "1" in FIG. 3) is allocated for the process of the TV broadcasting (FIG. 11A).

Subsequently, when an instruction is given from the user via the display changing portion 102 to make the brightness of the TV telephone frame 1220 higher than that of the TV broadcast frame 1210 (step S401), the display attribute management table 1102 is changed so that the high image-quality decoder is allocated for the process of the TV telephone (steps S402 and S403, FIGS. 11B and 12B). Subsequent processes are as described above.

With the above processes, even when a service is being provided, it is possible to perform a switching so that an AV stream displayed in an image display frame whose brightness is the highest and that thus attracts much attention of the user always can be decoded using a high image-quality decoder.

Example 5

In Examples 1 to 4, the methods have been described by which decoders are switched in accordance with a screen display state of the output portion 110 of the AV stream reproducing apparatus 100. In Example 5 here, a method will be explained by which decoders are switched in accordance with the form or operation (folding, rotation, flip (flex) and slide of the display portion, and connection with an earphone/microphone, for example) of the AV stream reproducing apparatus 100 itself, that is, the apparatus form. It should be noted that the screen display state and the apparatus form can be interpreted as a user's watching/listening form.

Figure 14A:
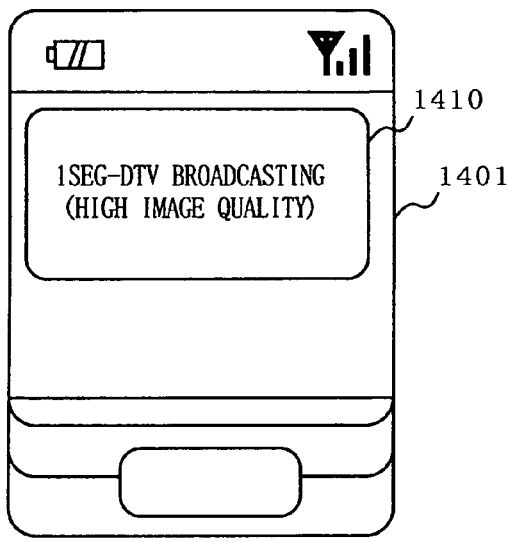
FIGS. 14A to 14C are examples of display screens in Example 5.
Figure 14B:
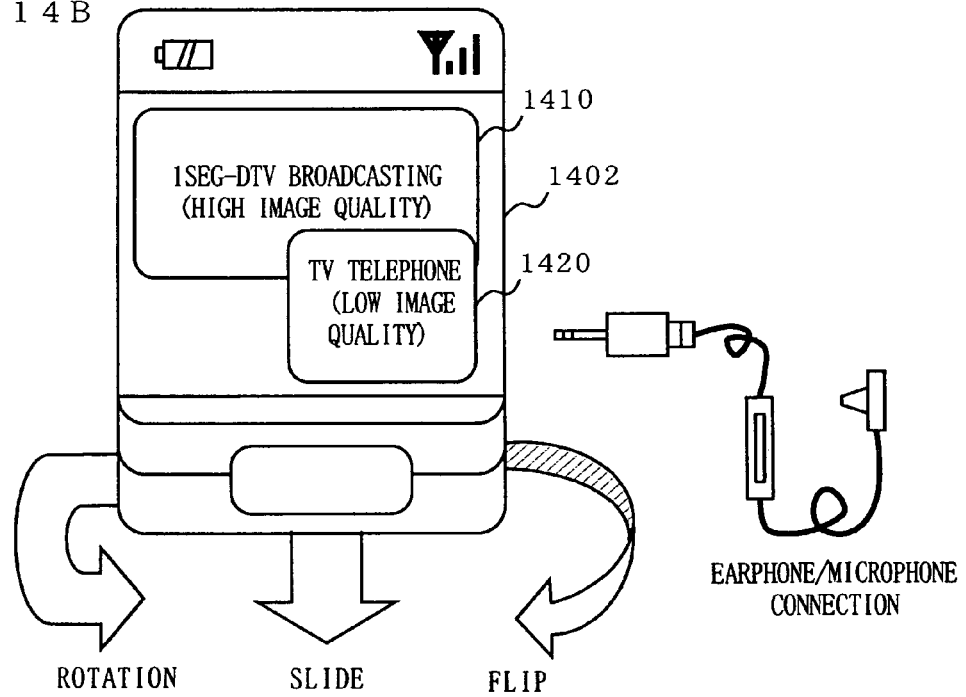
Figure 14C:
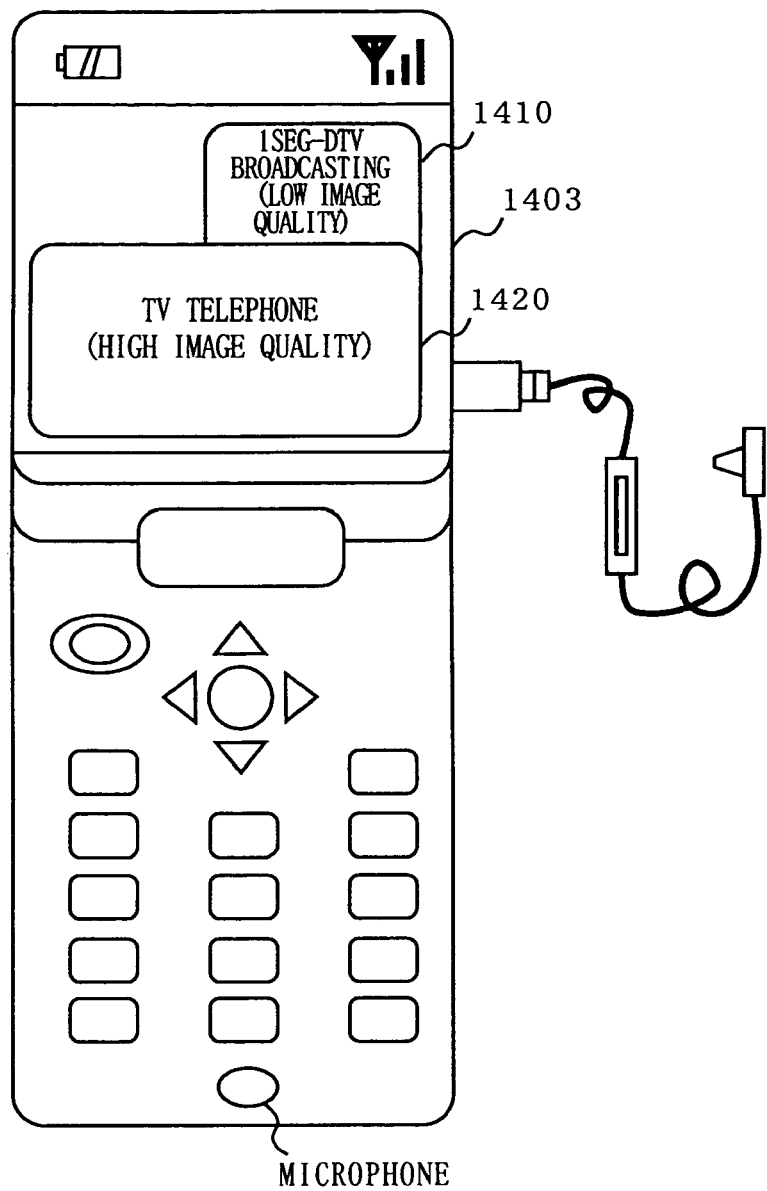

In Example 5, the case will be explained in which the apparatus form is set as the display attribute and the high image quality (value=0) is set as the decoder selecting criterion, in the decoder switching criterion management table 203 shown in FIG. 2C. FIG. 13 is a diagram showing an example of a display attribute management table 1301. FIGS. 14A to 14C are diagrams showing examples of apparatus forms of the AV stream reproducing apparatus 100.

Now, the case will be described in which while the AV stream reproducing apparatus 100 is in the folded form, the user is watching a TV broadcasting (FIG. 14A). In this state, a high image-quality decoder (decoder ID "1" in FIG. 3) is allocated for the process of the TV broadcasting (FIG. 13). Next, it is assumed that in this state, there is an incoming TV telephone call. Immediately after the call, a low image-quality decoder is allocated for the process of the TV telephone (FIG. 14B).

Subsequently, when the user performs an operation to change the form of the AV stream reproducing apparatus 100 defined as the apparatus form, the display attribute management table 1301 is changed so that the high image-quality decoder is allocated for the process of the TV telephone and the frame size thereof becomes large (steps S402 and S403, FIGS. 14B, 14C and 13). Subsequent processes are as described above.

With the above processes, even when a service is being provided, it is possible to perform a switching so that an AV stream displayed in an image display frame that attracts much attention of the user in accordance with an operation by the user to change the form of the AV stream reproducing apparatus 100 always can be decoded using a high image-quality decoder.

Figure 15:
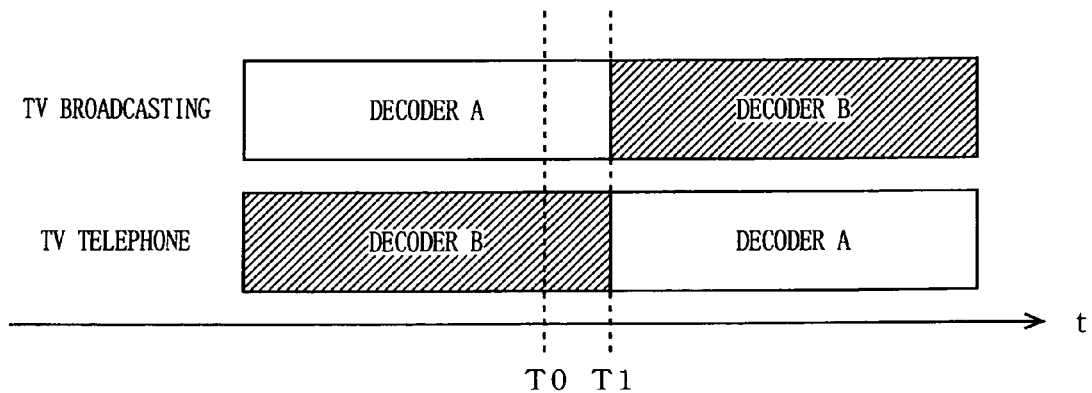
FIG. 15 is an example of a timing chart showing a switching of decoders.

It should be noted that a timing chart for a switching of decoders is set as shown in FIG. 15 so that when a display is changed at a time T0, a process of switching between decoders ends at a time T1.

Figure 16:
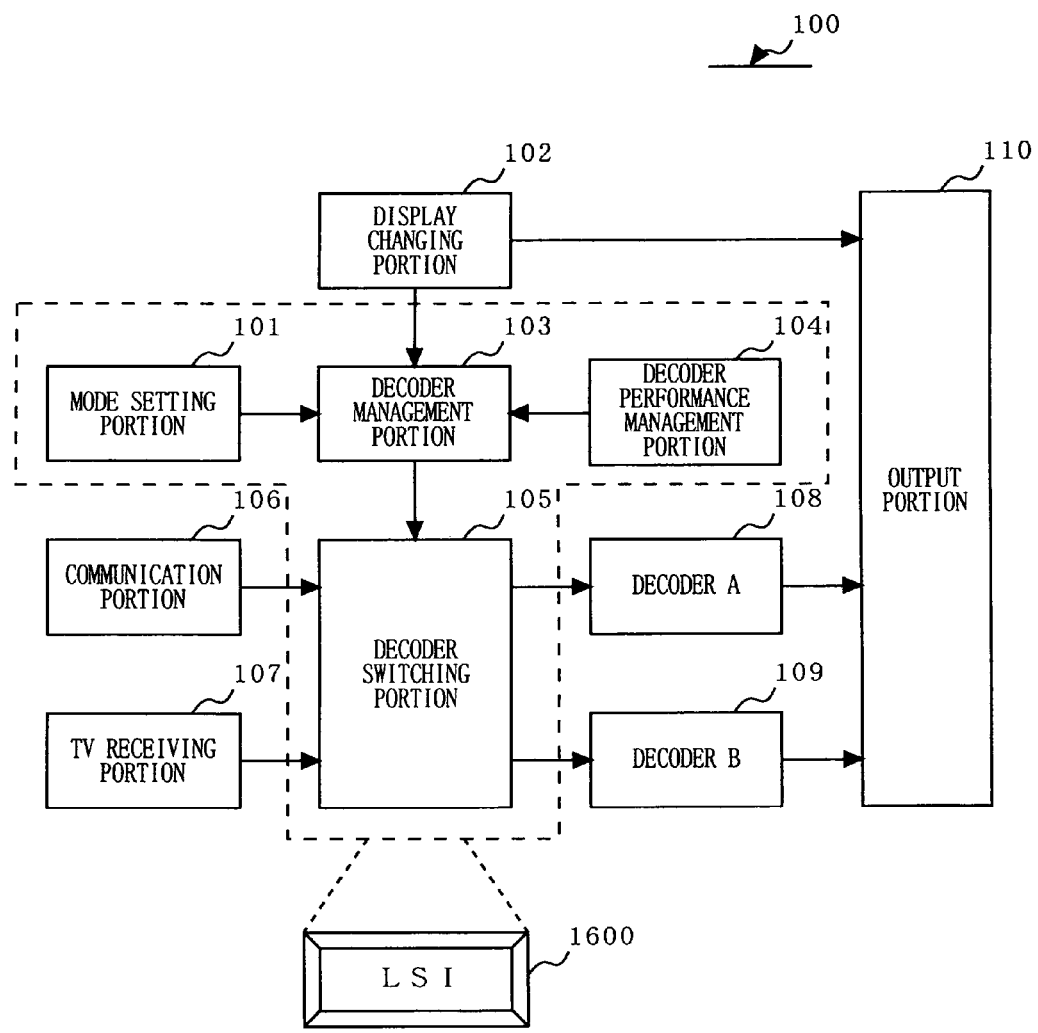
FIG. 16 is a diagram of a configuration in the case where the main functions of the AV steam reproducing apparatus shown in FIG. 1 are realized by an integrated circuit.

The functional blocks of the mode setting portion 101, the decoder management portion 103, the decoder performance management portion 104, and the decoder switching portion 105 shown in FIG. 1 are typically realized by an LSI 1600, which is an integrated circuit. Each of them may be formed on a single chip one by one, or a part or all of them may be formed on one chip. FIG. 16 shows an example of an integrated circuit formation. The LSI 1600 is an example of the range of the functional blocks that are formed on an integrated circuit. Although an LSI is used in this embodiment, this circuit may be called IC, system LSI, super LSI, or ultra LSI, depending on the difference of the degree of integration.

It should be noted that the method for forming an integrated circuit is not limited to using an LSI, and a circuit integration may be realized by a dedicated circuit or a general purpose processor. Furthermore, it is possible to use an FPGA (field programmable gate array) that can be programmed after an LSI is produced, and a reconfigurable processor being capable of reconfiguring connections and settings of circuit cells inside of the LSI.

Moreover, if circuit integration technology that replaces an LSI appears due to the development of semiconductor technology or derived another technology, the functional blocks may be integrated by using that technology. There is a possibility of, for example, application of biotechnology.

INDUSTRIAL APPLICABILITY

The AV stream reproducing apparatus and the decoder switching method according to the present invention can be used for, for example, a communication apparatus in which images of a TV broadcasting and a TV telephone are displayed on the screen, and are particularly suitable in, for example, the case where an optimal decoder for decoding an AV stream is selected among a plurality of decoders.

The invention claimed is:

1. An AV stream reproducing apparatus in which images reproduced from a plurality of AV streams are displayed on a screen at a same time, comprising:
    an AV stream acquisition portion configured to acquire a plurality of AV streams;
    a plurality of decoders configured to decode the plurality of AV streams acquired by said AV stream acquisition portion, said plurality of decoders including two or more decoders having different performance characteristics;
    a decoder performance management portion configured to manage image quality and electric power consumption for decoding the plurality of AV streams, which is acquired by said plurality of decoders, as information relating to performance characteristics of said plurality of decoders;
    a mode setting portion configured to set, based on a screen display state that is a Z-axis position of the image display frame, a user's watching/listening form for identifying and AV stream which attracts the user's attention;
    a decoder management portion configured to identify, in accordance with the user's watching/listing form instructed or operated by the user, an AV stream which is displayed on the uppermost side, and to determine, from among said plurality of decoders allocatable to the identified AV stream, a decoder capable of high-image quality decoding to be preferentially allocated to the identified AV stream, and, from among the other decoders allocatable to another AV stream, a decoder capable of lower-power consumption decoding to be allocated to the other AV stream, based on setting of said mode setting portion and information from said decoder performance management portion;
    a decoder switching portion configured to switch, according to determination of said decoder management portion, between decoders used for decoding the AV streams; and
    an output portion configured to allow a plurality of images decoded by said plurality of decoders to be displayed on a screen at a same time using individual image display frames.

2. The AV stream reproducing apparatus according to claim 1,
    wherein the user's watching/listening form is an apparatus form of the AV stream reproducing apparatus.

3. The AV stream reproducing apparatus according to claim 1, wherein the user's watching/listening form is an apparatus form of the AV stream reproducing apparatus.

4. A decoder switching method that is executed by an AV stream reproducing apparatus in which images reproduced from a plurality of AV streams are displayed on a screen at a same time, comprising the steps of:

acquiring a plurality of AV streams;

decoding the plurality of AV streams, by using a plurality of decoders having two or more decoders having different performance characteristics;

identifying, based on a screen display state that is a Z-axis position of the image display frame, a user's watching/listening form instructed or operated by the user;

identifying, in accordance with the user's watching/listening form instructed or operated by the user, an AV stream which is displayed on the uppermost side, and to determine, from among said plurality of decoders allocatable to the identified AV stream, a decoder capable of high-image quality decoding to be preferentially allocated to the identified AV stream, and, from among the other decoders allocatable to another AV stream, a decoder capable of low-power consumption decoding to be allocated to the other AV stream, based on predetermined information relating to the performance characteristics of the plurality of decoders, the performance characteristics being defined in accordance with image qualities and electric power consumption when the plurality of AV streams obtained by the plurality of decoders are decoded, and also based on the user's predetermined watching/listening form for identifying an AV stream which attracts the user's attention; and switching, according to determination in the determination step, between decoders used for decoding the AV stream.

5. A computer program stored on a computer-readable medium and having executable instructions for letting an AV stream reproducing apparatus in which images reproduced from a plurality of AV streams are displayed on a screen at a same time execute a decoder switching method, the program causing the AV stream reproducing apparatus to perform the steps of:

acquiring a plurality of AV streams;

decoding the plurality of AV streams by using a plurality of decoders the plurality of decoders having two or more decoders having different performance characteristics;

identifying, based on a screen display state that is a Z-axis position of the image display frame, a user's watching/listening form instructed or operated by the user;

identifying, in accordance with the user's watching/listening form instructed or operated by the user, an AV stream which is displayed on the uppermost side, and to determine, from among the plurality of decoders allocatable to the identified AV stream, a decoder capable of high-image quality decoding to be preferentially allocated to the identified AV stream, and, from among the other decoders allocatable to another AV stream, a decoder capable of low-power consumption decoding to be allocated to the other AV stream, based on predetermined information relating to the performance characteristics of the plurality of decoders, the performance characteristics being defined in accordance with image qualities and electric power consumption when the plurality of AV streams obtained by the plurality of decoders are decoded, and also based on the user's predetermined watching/listening form for identifying an AV stream which attracts the user's attention; and switching, according to determination in the determination step, between decoders used for decoding the AV streams.

6. A recording medium having recorded thereon a computer program with executable instructions for letting an AV stream reproducing apparatus in which images reproduced from a plurality of AV streams are displayed on a screen at a same time execute a decoder switching method, the program causing the AV stream reproducing apparatus to execute the steps of:

acquiring a plurality of AV streams;

decoding the plurality of AV streams by using a plurality of decoders, the plurality of decoders including two or more decoders having different performance characteristics, identifying, based on a screen display state that is a Z-axis position of the image display frame, a user's watching/listening form instructed or operated by the user;

identifying, in accordance with the user's watching/listening form instructed or operated by the user, an AV stream which is displayed on the uppermost side, and to determine, from among the plurality of decoders allocatable to the identified AV stream, a decoder capable of high-image quality decoding to be preferentially allocated to the identified AV stream, and, from among the other decoders allocatable to another AV stream, a decoder capable of low-power consumption decoding to be allocated to the other AV stream, based on predetermined information relating to the performance characteristics of the plurality of decoders, the performance characteristics being defined in accordance with image qualities and electric power consumption when the plurality of AV streams obtained by the plurality of decoders are decoded, and also based on the user's predetermined watching/listening form identifying an AV stream which attracts the user's attention; and switching, according to determination in the determination step, between decoders used for decoding the AV streams.

7. An integrated circuit used for an AV stream reproducing apparatus in which images reproduced from a plurality of AV streams are displayed on a screen at a same time, wherein the integrated circuit is built in an AV stream reproducing apparatus provided with an AV stream acquisition portion for acquiring a plurality of AV streams, a plurality of decoders for decoding the acquired plurality of AV streams, the plurality of decoders including two or more decoders having different performance characteristics and an output portion for outputting a plurality of images decoded by the plurality of decoders to be displayed on a screen at a same time using individual image display frames, and wherein the integrated circuit function as:

a decoder performance management portion configured to manage image quality and electric power consumption for decoding the plurality of AV streams, which is acquired by the plurality of decoders, as information relating to performance characteristics of the plurality of decoders;

a mode setting portion configured to set, based on a screen display state that is a Z-axis position of the image display frame, a user's watching/listening form for identifying an AV stream which attracts the user's attention;

a decoder management portion configured to identify, in accordance with the user's watching/listening form instructed or operated by the user, an AV stream which is displayed on the uppermost side, and to determine, from among the plurality of decoders allocated to the identified AV stream, a decoder capable of high-image quality decoding to be preferentially allocated to the identified AV stream, and, from among the other decoders allocatable to another AV stream, a decoder capable of low-power consumption decoding to be allocated to the other AV stream, based on setting of said mode setting portion and information from said decoder performance management portion; and a decoder switching portion configured to switch, according to determination of said decoder management portion, between decoders used for decoding the AV steams.

* * * * *